(12) United States Patent
Hasson et al.

(10) Patent No.: US 8,447,883 B1
(45) Date of Patent: May 21, 2013

(54) REDUCING ENERGY CONSUMPTION OF SERVERS

(75) Inventors: Uri Hasson, Kiryat Ono (IL); Michael Shurman, Bat Hefer (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/599,878

(22) Filed: Aug. 30, 2012

Related U.S. Application Data

(63) Continuation of application No. 12/660,278, filed on Feb. 24, 2010, now Pat. No. 8,260,958.

(51) Int. Cl.
*G06F 15/16* (2006.01)
*G06F 15/173* (2006.01)

(52) U.S. Cl.
USPC ............................ 709/238; 709/217; 709/223

(58) Field of Classification Search
USPC ........................................ 709/217, 223, 238
See application file for complete search history.

(56) References Cited

U.S. PATENT DOCUMENTS

| | | | |
|---|---|---|---|
| 7,281,045 B2 | 10/2007 | Aggarwal et al. | |
| 7,349,960 B1 | 3/2008 | Pothier et al. | |
| 7,424,528 B2 | 9/2008 | Cherkasova et al. | |
| 7,464,014 B2 | 12/2008 | Nace et al. | |
| 7,500,001 B2 | 3/2009 | Tameshige et al. | |
| 7,512,702 B1 | 3/2009 | Srivastava et al. | |
| 7,574,499 B1 | 8/2009 | Swildens et al. | |
| 7,580,822 B2 | 8/2009 | Nace et al. | |
| 7,581,008 B2 | 8/2009 | Zhang et al. | |
| 7,584,301 B1 | 9/2009 | Joshi | |
| 7,624,169 B2 | 11/2009 | Lisiecki et al. | |
| 7,747,730 B1 | 6/2010 | Harlow | |
| 7,779,156 B2 | 8/2010 | Alperovitch et al. | |
| 7,784,055 B2 | 8/2010 | Srivastava | |
| 7,788,524 B2 | 8/2010 | Wing et al. | |
| 7,792,931 B2 | 9/2010 | Vinberg et al. | |
| 7,805,510 B2 | 9/2010 | Bansal et al. | |
| 7,822,589 B2 | 10/2010 | Bhattacharya et al. | |
| 7,830,896 B2 | 11/2010 | Srivastava | |
| 7,836,168 B1 | 11/2010 | Vasko et al. | |
| 7,840,678 B2 | 11/2010 | Joshi | |
| 7,877,755 B2 | 1/2011 | Steinder et al. | |
| 7,933,990 B2 | 4/2011 | Munger et al. | |
| 7,941,516 B2 | 5/2011 | Wong et al. | |

(Continued)

OTHER PUBLICATIONS

Schmoll, C. et al. "Guidelines for IP Flow Information Export (IPFIX) Testing," RFC 5471, Mar. 2009.*

(Continued)

*Primary Examiner* — Lynn Feild
*Assistant Examiner* — Melvin H Pollack
(74) *Attorney, Agent, or Firm* — Frommer Lawrence & Haug LLP; John W. Branch

(57) ABSTRACT

A load balancer, comprising a network interface, a power conservation unit, and a routing module configured to route client requests received through the network interface to a plurality of servers. The power conservation unit is characterized by having a learning mode and a routing mode. In the learning mode one or more operation parameters of the servers are determined for a plurality of different external conditions and for a plurality of different values of one or more operation parameters of the routing module, and to generate a correlation table between the operation parameters of the routing module and the external conditions. In the routing mode the power conservation unit adjusts the operation parameters of the routing module responsive to the external conditions, using the correlation table.

23 Claims, 3 Drawing Sheets

U.S. PATENT DOCUMENTS

| | | | |
|---|---|---|---|
| 8,015,280 B2 | 9/2011 | Saha et al. | |
| 8,041,976 B2 | 10/2011 | Kern et al. | |
| 8,144,587 B2* | 3/2012 | Heinz et al. | 370/235 |
| 8,160,063 B2* | 4/2012 | Maltz et al. | 370/389 |
| 8,185,654 B2* | 5/2012 | Degenaro et al. | 709/238 |
| 8,238,253 B2* | 8/2012 | Morrill | 370/241 |
| 8,239,538 B2* | 8/2012 | Zhang et al. | 709/226 |
| 8,260,893 B1* | 9/2012 | Bandhole et al. | 709/223 |
| 8,260,958 B2* | 9/2012 | Hasson et al. | 709/238 |
| 8,264,971 B2* | 9/2012 | Alfano et al. | 370/242 |
| 8,266,319 B2* | 9/2012 | Zisapel et al. | 709/238 |
| 8,274,905 B2* | 9/2012 | Edwards et al. | 370/252 |
| 8,281,010 B2* | 10/2012 | Ansari et al. | 709/225 |
| 8,302,100 B2* | 10/2012 | Deng et al. | 718/104 |
| 2005/0172011 A1 | 8/2005 | Gourlay et al. | |
| 2006/0036726 A1 | 2/2006 | Fabbio et al. | |
| 2007/0192863 A1 | 8/2007 | Kapoor et al. | |
| 2009/0106571 A1 | 4/2009 | Low et al. | |
| 2011/0032821 A1 | 2/2011 | Morrill et al. | |
| 2011/0208875 A1* | 8/2011 | Hasson et al. | 709/238 |
| 2011/0213869 A1 | 9/2011 | Korsunsky et al. | |
| 2012/0011384 A1* | 1/2012 | Lee | 713/323 |
| 2012/0311138 A1* | 12/2012 | Inamdar et al. | 709/224 |

OTHER PUBLICATIONS

Wu, J. et al. "A Source Address Validation Architecture (SAVA) Testbed and Deployment Experience," RFC 5210, Jun. 2008.*

Gurbani, V. et al. "Session Initiation Protocol (SIP) Torture Test Messages for Internet Protocol Version 6 (IPv6)," RFC 5118, Feb. 2008.*

Choi, Eunmi. "Performance Test and Analysis for an Adaptive Load Balancing Mechanism on Distributed Server Cluster Systems," Future Generation Computer Systems, Science Direct, vol. 20, Issue 2, Feb. 16, 2004, pp. 237-247.*

Wilson, L. F. et al. "Experiments in Load Migration and Dynamic Load Balancing in SPEEDES," vol. 1, Dec. 16, 1998, pp. 483-490.*

Official Communication for U.S. Appl. No. 12/660,278 mailed Feb. 22, 2011.

Official Communication for U.S. Appl. No. 12/660,278 mailed Oct. 24, 2011.

Official Communication for U.S. Appl. No. 12/660,278 mailed Apr. 30, 2012.

* cited by examiner

REDUCING ENERGY CONSUMPTION OF SERVERS

CROSS-REFERENCE TO RELATED APPLICATION

This utility patent application is a Continuation of pending U.S. patent application Ser. No. 12/660,278 filed on Feb. 24, 2010, the benefit of which is claimed under 35 U.S.C. §120, and is further incorporated herein by reference.

FIELD OF THE INVENTION

The present invention relates to communication systems and in particular to servers for communication systems.

BACKGROUND OF THE INVENTION

The Internet has become a major platform for provision of data, due to its wide availability. High Volume Internet content providers employ large server farms in order to provide responses to user requests for information within a short response time. The request load received by the server farm varies greatly over time, and consequently there are times in which some of the servers in such server farms are idle.

US patent publication 2009/0106571 to Low at al., titled: "Systems and Methods to Adaptively Balance User Sessions to Reduce Energy Consumption", the disclosure of which is incorporated herein by reference in its entirety, describes a power management schedule for a server group, which dynamically controls the level of power of the servers according to the load on the servers. In paragraph [0213] thereof, Low suggests that the power control system use a plurality of set point parameters chosen to meet a desired relationship between load and capacity.

SUMMARY OF THE INVENTION

An aspect of some embodiments of the present invention relates to a load balancer for distributing client requests to servers within a server farm, the load balancer being adapted to operate in both a learning mode and in a routing mode, in the learning mode, the load balancer determines one or more operation parameters of the servers for a plurality of different external conditions, such as load levels, and for a plurality of different values of one or more operation parameters of the load balancer. According to the server operation parameter values, the load balancer selects load balancer parameter values as appropriate for the various external conditions. In the routing mode, the load balancer dynamically adjusts at least one of its operation parameters according to the learning mode and the current external conditions.

In some embodiments of the invention, the adjusted load balancer parameters include the number of servers to which the client requests are distributed by the load balancer. Alternatively or additionally, the adjusted load balancer parameters include the number of connections established with each of the servers for carrying the client requests. Further alternatively or additionally, the adjusted load balancer parameters include the rate at which requests are forwarded to each of the servers. Another load balancer parameter which may be adjusted according to the results of the learning mode is the number of processors that the load balancer instructs the servers to employ. In some embodiments of the invention, however, some or all of the servers automatically control the number of cores they employ according to the work load they are provided and instructions from the load balancer as to the number of employed cores are not provided.

The learning mode may be relatively long, requiring at least an hour, at least a day or even more than 50 hours. Alternatively, a shorter learning mode may be used in which fewer load values and/or load balancer parameter values are tested.

The server operation parameter monitored during the learning mode is optionally the response time to client requests. In some embodiments of the invention, the monitored server operation parameters also include the power consumption of the servers and/or the number of cores employed by the servers.

In an exemplary embodiment of the invention, the load balancer attempts to minimize the number of connections it establishes with the servers and/or the number of servers it utilizes; while still achieving a reasonable response time. Alternatively or additionally, the load balancer attempts to provide a best response time using a minimal number of server processor cores.

In some embodiments of the invention, the load balancer operates during the routing mode without aid of agents on the servers. Furthermore, in some embodiments of the invention, the load balancer does not require agents on the servers during the learning mode.

An aspect of some embodiments of the invention relates to a load balancer which is adapted to dynamically adjust the number of servers to which it forwards client requests and/or the number of connections it establishes with the servers, but does not directly control the power levels of the servers. Instead, the servers themselves adjust their power consumption according to their loading. While it may have been expected that using servers that self adjust their power consumption avoids the need of the load balancer to take into account power considerations, the inventors of the present invention have found that even if all the servers self adjust their power consumption to their current load, in many cases there is still an advantage in managing the power consumption globally by the load balancer.

There is therefore provided in accordance with an exemplary embodiment of the invention, a load balancer, comprising a network interface, a routing module configured to route client requests received through the network interface to a plurality of servers; and a power conservation unit configured to operate in a learning mode in which one or more operation parameters of the servers are determined for a plurality of different external conditions and for a plurality of different values of one or more operation parameters of the routing module, and to generate a correlation table between the operation parameters of the routing module and the external conditions; and a routing mode in which the power conservation unit adjusts the operation parameters of the routing module responsive to the external conditions, using the correlation table.

Optionally, the one or more operation parameters of the servers comprise a measure of the response time to client requests. Optionally, the one or more operation parameters of the routing modulo comprise the number of servers to which client requests are routed. Optionally, the one or more operation parameters of the routing module comprises a number of connections used by the routing module to route client requests to the servers. Optionally, the one or more operation parameters of the routing module comprises a rate at which the routing module forwards client requests to the servers.

Optionally; the routing module is adapted to operate with multi-core servers that are configured to self adjust the number of cores they use to the loads thereupon. Optionally, during the learning mode the power conservation unit transmits to the servers test requests generated by the load balancer. Optionally, during the learning mode the power conservation unit selects operation parameters of the routing module corresponding to specific external conditions as the routing module parameters that use the least resources but still provide a response time within a required range.

Optionally, the power conservation unit is adapted to periodically enter the learning mode responsive to a determination that the correlation table is inaccurate and/or at predetermined times. Optionally, during the learning mode the routing module is adapted to route client requests received through the network interface to the servers. Optionally, during the learning mode the routing module is adapted to generate test requests that are not received through the network interface and to forward the generated test requests to the servers.

Optionally, the routing module is adapted to generate the test requests based on client requests received through the network interface.

There is further provided in accordance with an exemplary embodiment of the invention, a method of routing client requests to servers by a load balancer, comprising operating the load balancer in a learning mode in which a plurality of load balancer parameter values are tested for each of a plurality of specific external conditions, and accordingly a specific set of load balancer parameter values are selected for each specific external conditions; and during a routing mode of the load balancer, determining external conditions and selecting load balancer parameter values responsive to the determined external conditions.

Optionally, the method includes automatically entering the learning mode responsive to a determination that the average response time of the servers is outside a predetermined value range.

There is further provided in accordance with an exemplary embodiment of the invention, a method of load balancing, comprising receiving client requests by a load balancer; forwarding the client requests to a plurality of servers adapted to adjust the number of cores they use responsive to their load; determining a load on the load balancer; and adjusting the number of connections used to forward the client requests to the servers, responsive to the determined load.

Optionally, adjusting the number of connections comprises adjusting to a number selected during a learning mode of the load balancer for the determined load.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Overview

Figure 1:
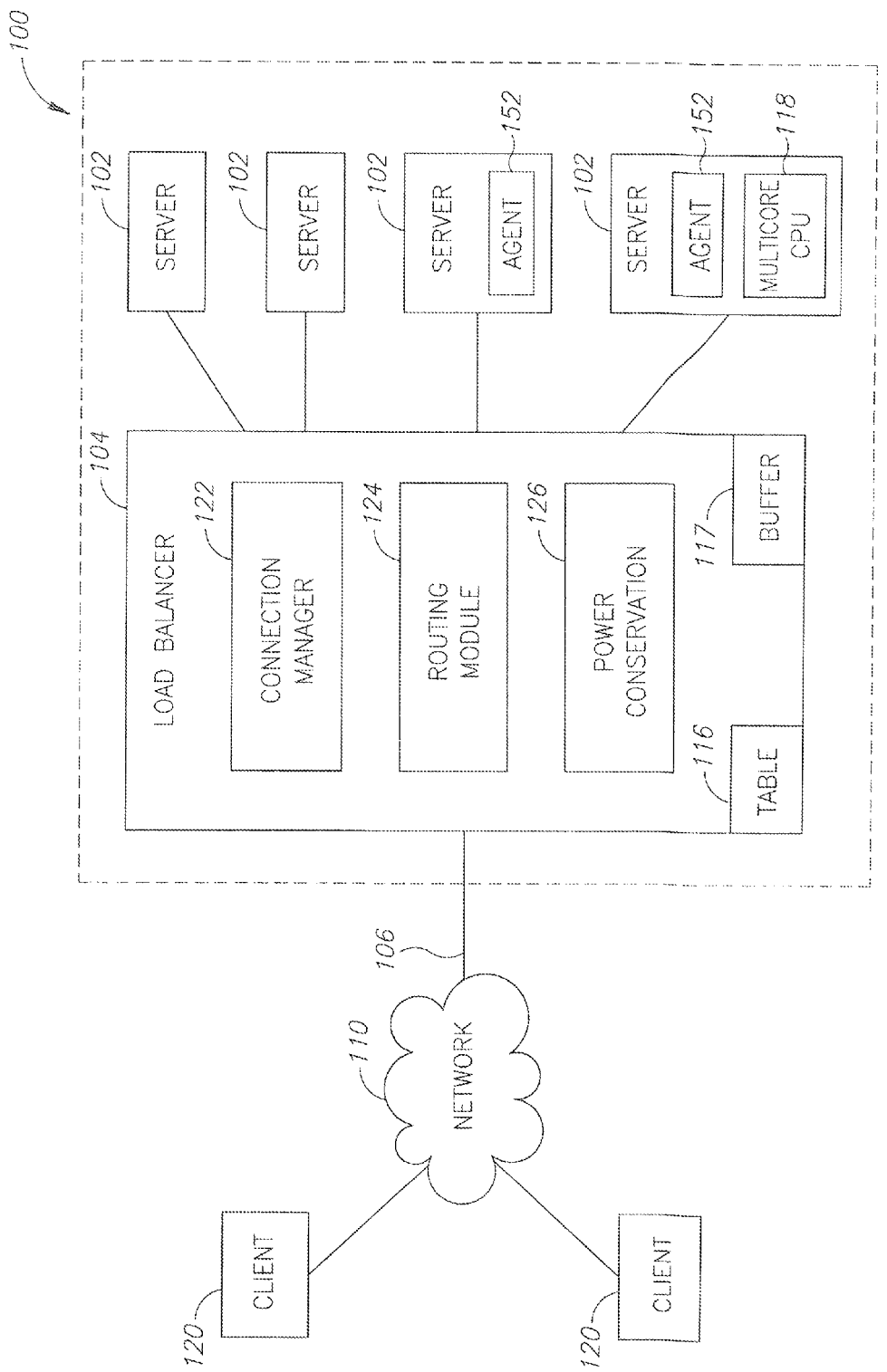
FIG. 1 is a schematic block diagram of a server system, in accordance with an exemplary embodiment.

FIG. 1 is a schematic block diagram of a server system 100, in accordance with an exemplary embodiment. Server system 100 comprises a plurality of servers 102 and a load balancer 104. Load balancer 104 is optionally connected through a network interface 106 to a network 110 through which client requests are received from a plurality of clients 120. In some embodiments, at least some of servers 102 comprise multi-core CPUs 118 and they automatically adjust the number of operative cores according to their load.

Load balancer 104 optionally includes a connection manager 122 which establishes connections with servers 102 for directing client requests thereto, a routing module 124 which routes the requests to selected servers 102 and a power conservation module 126 which monitors the number of client requests received through network interface 106 and accordingly adjusts the number of servers 102 it uses and/or the number of connections it manages with the servers 102. Load balancer 104 may include other modules, such as a module (not shown) for receiving responses from servers 102 and forwarding them to clients 120.

Load balancer 104 optionally has two operation modes: a learning mode in which for various external conditions, such as load levels, it selects how many servers 102 and how many connections to the servers 102 should be used and a routing mode in which it directs client requests to servers 102 at least partially in accordance with parameters obtained in the learning mode.

Learning Mode

Figure 2:
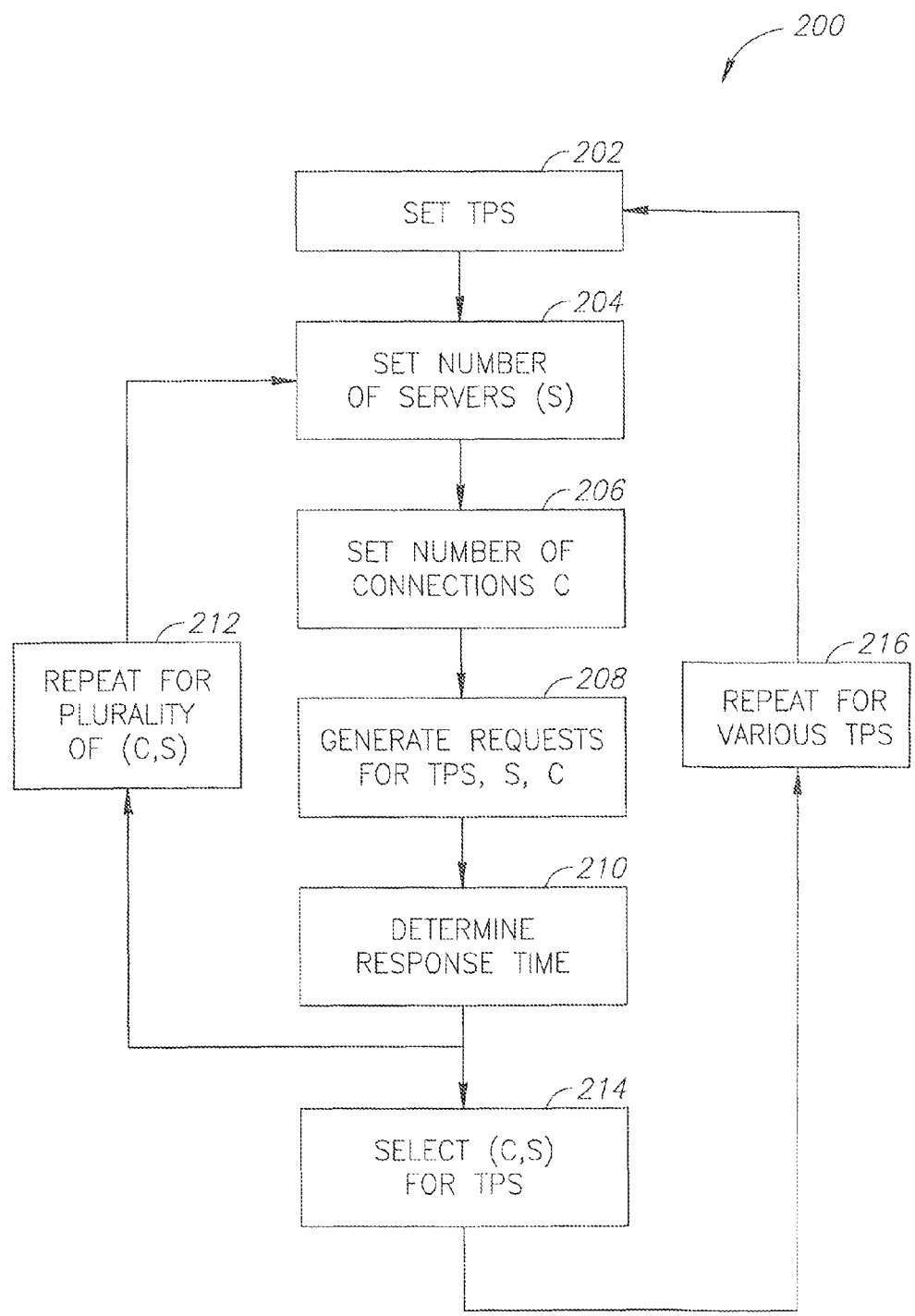
FIG. 2 is a flowchart of acts performed by a load balancer during a learning mode, in accordance with an exemplary embodiment.

FIG. 2 is a flowchart of acts performed by load balancer 104 during a learning mode 200, in accordance with an exemplary embodiment of the invention. In the learning mode, load balancer 104 optionally sets (202) a load parameter value, for example a TPS (transactions per second) parameter representing the number of requests to be sent to servers 102 per second, to an initial value. Load balancer 104 optionally also sets (204) a value for a parameter S indicating the number of servers 102 to receive the requests and sets (206) a parameter C representing the number of connections to be used to carry the requests to the servers. Load balancer 104 then transmits (208) requests to servers 102 at the rate prescribed by the parameter value TPS over a number of connections C, to a number of servers S. During the transmission, load balancer 104 determines (210) the response times of the requests. The transmission (208) of requests and the determination (210) of response times are repeated (212) for a plurality of different values of the number of connections C and number of servers S. After repeating the determination of response times for various combinations of C and S, load balancer 104 selects (214) for the current TPS value a combination of C and S to be used for the load represented by the current TPS, for example a combination of C and S which provides a suitable response time at a low power consumption.

The testing and selection of C and S parameters is repeated (216) for a plurality of values of TPS, forming a table 116 which lists for a span of TPS values the corresponding C and S values to be used.

Transmitted Requests

As to transmitting (208) the requests to servers 102 during the learning mode 200, in some embodiments of the invention the learning mode 200 of load balancer 104 is performed while server system 100 is operative and the transmitted requests are the actual requests received from the clients 120. Optionally, in order to transmit the prescribed amount of requests according to the selected TPS, load balancer 104 buffers the requests received from clients 120 in a buffer 117, and regulates the transmission of requests to the servers 102 according to the current selected TPS value. Optionally, when the rate of received requests is substantially lower than required by the current selected TPS value, load balancer 104 periodically stops forwarding requests and determining the response times until the buffer 117 refills sufficiently. Alternatively or additionally, when the load of incoming requests from clients is lower than required by the current selected TPS value, load balancer 104 generates test requests not received from clients 120 and these test requests are forwarded to servers 102 as if they were real client requests. Optionally, when the responses to the test requests are returned back to load balancer 104 they are identified and discarded. The test requests are optionally labeled in a manner which will cause the responses generated responsive thereto to be easily identifiable by load balancer 104 for example they may be generated with a fictitious sender address. Other methods may also be used to mark the test requests.

In some embodiments of the invention, the generated test requests are of a predetermined average type, all requiring substantially the same processing power. Alternatively, the test requests are generated with a randomly selected processing requirement, so as to test the servers 102 with different types of client requests. In some embodiments of the invention, the test requests are of a type expected to be provided to server system 100. Optionally, the test requests are generated as duplicates of real client requests received recently or even of real client requests received concurrently. For example, if requests are currently being received at half the TPS rate, load balancer 104 duplicates each received request in order to achieve the required TPS value.

Optionally, when the amount of received client requests is greater than required for the current TPS value, the excess client requests accumulated in buffer 117 are forwarded to one or more redundant servers not being tested, which are employed specifically to handle excess requests during the learning mode 200.

Order of Operation

The learning mode 200 may be carried out continuously until completion or may be performed intermittently, for example at times when the load on server system 100 is low and adding extra test requests which will lower the response time will affect relatively few clients 102. In some embodiments, during the day time and/or work hours, the learning mode 200 operates without adding test requests or adding only small amounts of test requests, while during the night and/or low usage hours, the learning mode 200 injects substantial amounts of test requests, when necessary to test high TPS situations.

As described above, load balancer 104 may be configured to first test all the C and S values for a specific TPS and then moves to testing for a different TPS. In other embodiments, however, load balancer 104 sets values of C and S and first iterates over a plurality of TPS values before moving to a next set of C and S values. For example, the tests may begin with C and S values and move up to higher values, may begin with high values and move down to lower values or a mixed approach may be used.

Optionally, when the learning mode 200 is performed on real client requests and providing timely responses is important, load balancer 104 starts with higher values of C and S and moves down until a response time beyond that allowed by the service level agreement (SLA) of system 100 is reached. On the other hand, when it is important to avoid waste of resources during the learning mode, load balancer starts with lower values of C and S and proceeds to higher values until it is determined that using higher C and/or S values does not shorten the response time and/or the response time is substantially shorter than required by the SLA governing the operation of system 100. In some embodiments of the invention, the user may select the order of changing the C and S values. The order of scanning the C and S values may also be selected according to the load on server system 100. Optionally, higher C and S values are used when the load due to real client requests is high, while lower C and S values are used when the load on servers 102 is mainly due to test requests.

Alternatively or additionally to regulating the rate of providing client requests to servers 102 according to selected TPS values, load balancer 104 does not set a TPS value and does not regulate the rate of the received client requests. Instead, load balancer 104 keeps track of the current rate of requests received and determines the TPS value corresponding to the current rate of receiving client requests. For each set of C and S values, load balancer 104 collects pairs of TPS values and corresponding response times. Once a sufficient number of measurements are collected for each of the TPS values for which measurements are desired, load balancer 104 changes the C and/or S values and repeats the determination. Alternatively or additionally, after a predetermined time collecting data for a specific set of C and S values, load balancer 104 moves on to a different set of C and S values, even if for some TPS values very little information was collected. This alternative is optionally used when TPS values encountered rarely in the learning mode 200 are not expected to appear often in the routing mode. Further alternatively or additionally, when the data collected for a specific set of C, and TPS values is below a minimum amount, load balancer 104 regulates the rate of supplying requests to the servers 102 in order to fill in the missing information. The regulation may be performed after data is collected for each pair of C and S or may be collected after data was collected for all C and S values.

In some embodiments of the invention, instead of performing the learning mode 200 on real client requests, in a manner which may interfere with the handling of the client requests, the learning mode is performed before system 100 begins to receive client requests. Alternatively or additionally, the learning mode is performed after server system 100 is operative, but during the learning mode, a redundant server is put into operation to service the client requests while the other servers are being tested.

Length and Frequency of Learning Mode

The learning mode 200 is optionally entered only once, at the time of installation. Alternatively, the learning mode 200 is performed each time the system configuration is updated, for example when a server 102 is added, removed, replaced and/or reconfigured. Further alternatively or additionally, the learning mode 200 is performed periodically, for example once every month or every year. In some embodiments of the invention, as described below, the effectiveness of the table 116 values is monitored and the learning mode 200 is performed when problems with the values are detected.

In some embodiments of the invention, the learning mode is performed over at least a day, at least 2 days or even at least a week. Alternatively, a shorter learning period is used. Optionally, different learning periods are used at different times. For example, at system configuration a long learning period may be used, while a short learning period, such as may be performed over night or in less than an hour may be used while system 100 is operative. In the short learning period, load balancer 104 optionally tests fewer possible TPS, S and/or C values.

In some embodiments, during the learning mode 200, the span of TPS values tested is from a relatively narrow span of values representing the loads for which system 100 is expected to operate. Optionally, before beginning the setting (202) of TPS values in the learning mode, load balancer 104 operates in a pre-learning mode in which client requests are handled without regulation and the TPS values of the normal operation of server system 100 are recorded. Thereafter, the learning mode 200 operates on the span of TPS values covering the values encountered in the pre-learning mode. Optionally, the span of TPS values tested during the learning mode is larger than required to cover the pre-learning mode values by a safety margin, for example at least 10% or 20% of the span in each direction, it is noted that if during the routing mode 300 (FIG. 3), load balancer 104 encounters TPS levels for which learning mode data was not collected, load balancer 104 optionally enters a learning mode to determine parameters for these TPS values and their surrounding values. Alternatively, the learning mode includes tests for a very large span of TPS values, such that such additional learning mode operations are not required or are required less often.

Parameter Selection

As to selecting (214) C and S values for tested TPS values, in some embodiments of the invention, the lowest C and S values which still achieve a response time which is within the limits of the promised quality of service (QoS) of server system 100 or is otherwise considered sufficient, are selected. Optionally, the lowest acceptable number of servers S is first selected and then the corresponding lowest acceptable number of connections C for the selected number of servers is selected. Alternatively, the lowest acceptable number of connections C is first selected and then a corresponding suitable number of servers 102 is selected. Further alternatively, a minimization function which uses predetermined weightings for the number of connections C and for the number of servers S, is used. In other embodiments of the invention, in selecting the C and S values the response time is taken into account beyond meeting the minimal required response time. For example, in one embodiment, after determining the C and S values which meet the minimal required response time, load balancer 104 determines whether adding a small number of connections can have a substantial improvement in response time, and if this is the case, the higher values of C and S are selected.

Alternative Parameters

Alternatively or additionally to using TPS as the load parameter value, other load parameters may be used, such as the volume of the output (e.g., in bytes) of servers 102 per second, the quantity (e.g., in bytes) of the received requests and/or a total request complexity value calculated as a sum of complexities scores assigned to the received requests.

In some embodiments of the invention, different tables 116 are generated for different values of one or more external parameters other than the load. For example, different tables may be generated for different times during the day (e.g., morning, afternoon or night) or different days of the week (e.g., workdays vs. weekends). Calculating separate C and S parameter values for different external parameters may provide a better adaptation of the parameter values to the conditions, as the types of requests may differ with the time of day. Other external parameters for which different tables 116 may be generated are average request complexity; indicating a complexity of the requests being received and an average request priority indicating the importance rating given on the average to the currently received requests.

Alternatively or additionally to monitoring the response time, other parameters of servers 102 may be monitored and their values used in determining which C and S parameters to select for specific external conditions. Such other server parameters may include, for example, the number of cores employed by the servers 102, their CPU utilization and/or the heat output of servers 102.

Alternatively or additionally to testing the operation of servers 102 for a plurality of different numbers of servers S and/or numbers of connections C, the learning mode may involve testing utilization of various numbers of processors. According to this option, some or all of servers 102 include a plurality of processors, a plurality of stand alone processors and/or one or more multi-core processing units, and the hardware of the server and/or its operating system are designed to receive external instructions on the number of processors (e.g., stand alone processors or cores) it is to use. Load balancer 104 instructs the servers 102 to operate at different times with different numbers of processors and determines the resultant response times for different loads.

While in the above description load balancer 104 adjusts the number of connections it manages with servers 102, in other embodiments the client requests are forwarded to servers 102 using a connectionless protocol, such as User Datagram Protocol (UDP), in such embodiments, load balancer 104 optionally determines during the learning mode a best number of bytes per second, new sessions per second and/or application layer requests per second to be provided to each of the servers 102 for various values of the transaction per second (PPS) parameter.

Agents on Servers

In some embodiments, during the learning mode load balancer 104 does not monitor the actual state of the servers 102 and does not employ any agents on servers 152. The selection (214) of C and S parameters by load balancer 104 attempts to minimize the number of servers it uses and the number of connections established with the servers. In other embodiments of the invention, load balancer 104 receives during the learning mode feedback from servers 102, for example from respective agents 152 running on the servers. Optionally, in order not to interfere with the normal operation of the servers 102, the agents operate on the servers 102 only during the learning mode 200. In some embodiments of the invention, the agents 152 are not installed on servers 102 but rather are portable software patches Optionally, the agent 152 comprises a script, such as a Visual Basic script, an Active Server Pages (ASP) script, a PHP Hypertext Processor (PHP) script or a Java Server Pages (JSP) script. In other embodiments, load balancer 104 receives information from the server 102 by querying standard software on the server which is not specifically designed for operation with load balancer 104 of the present invention. The feedback from servers 102 optionally includes statistics on CPU utilization and/or on how many cores are operated. Using this information, load balancer 104 optionally selects (214) for each TPS value, C and S values which achieve the lowest power utilization with response times within the required limits. Alternatively, load balancer 104 selects C and S values which provide the best response time for the lowest possible power utilization which still meets the required response time.

When information which correlates between the number of connections to a server 102 and the number of corps it operates is available, for example based on measurements of an agent 152 on the server 102, after selecting a C value which provides a sufficient response time, the C value for each server 102 is optionally increased to the highest number which still utilizes the same number of cores.

Alternatively to testing all the servers 102 together, each server is tested separately to determine its response time for a plurality of different TPS levels and numbers of connections. During the routing mode, for a given TPS, power conservation module 126 selects a number of servers 102 required to meet the current TPS and for each server selects a number of connections corresponding to the TPS of that server. It is noted that the servers 102 do not necessary have to be identical and different servers may have different processing power attributes.

As to determining (210) the response time, in some embodiments of the invention, the average or median of the response times for all the handled requests is used. Alternatively, the worst case response time or the response time of a given percentile (e.g., the response time for which 90% of the requests received faster responses) is used. In other embodiments, a weighted average of the response times giving different weight to responses to different types of requests, is used.

Routing Mode

Figure 3:
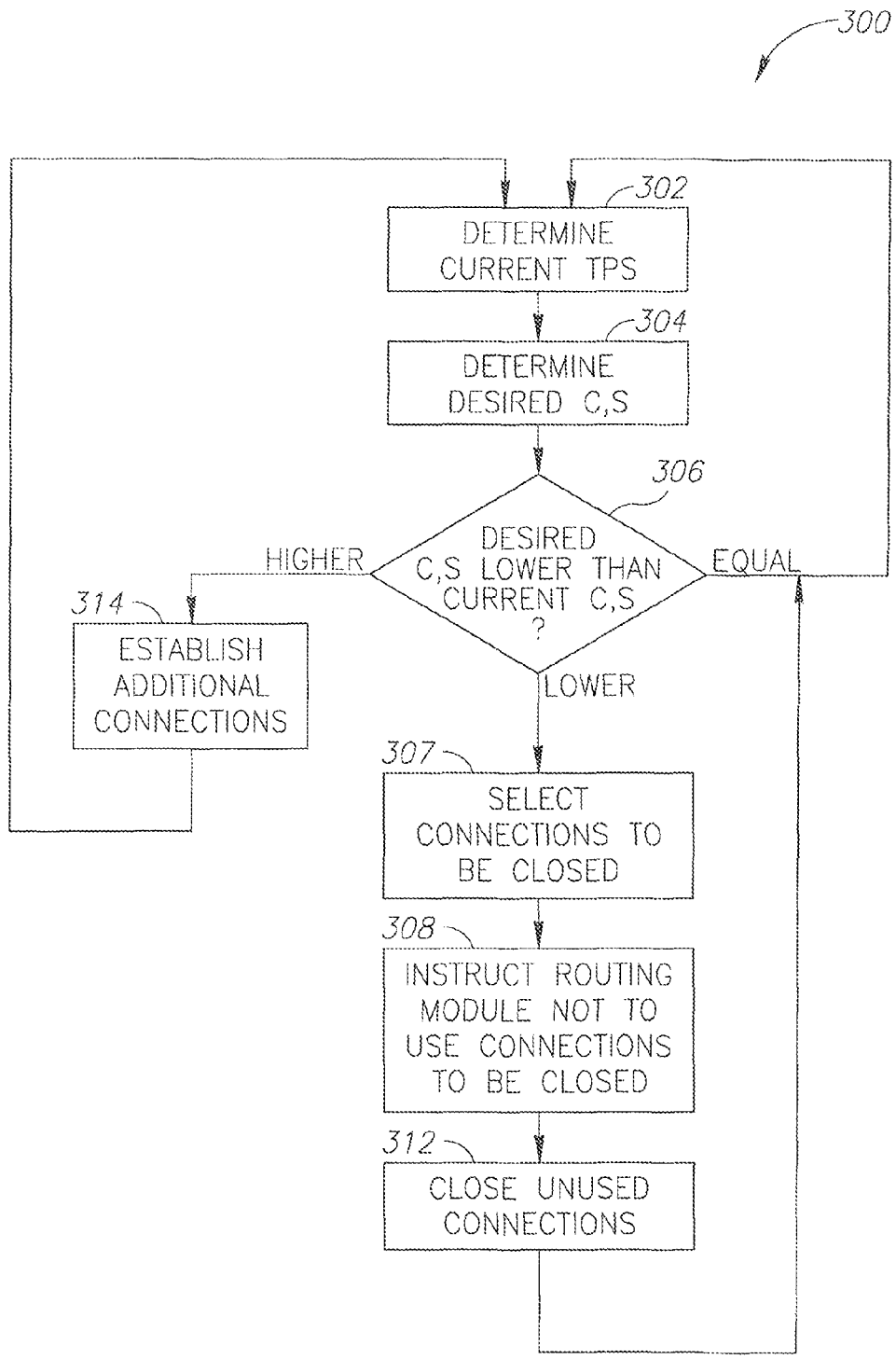
FIG. 3 is a flowchart of acts of a power conservation module during a touting mode, in accordance with an exemplary embodiment.

FIG. 3 is a flowchart of acts of power conservation module 126 during a routing mode 300 of load balancer 104, in accordance with an exemplary embodiment of the invention. Periodically, power conservation module 126 determines (302) the number of requests per second (TPS) currently handled by servers 102 and responsive thereto determines (304) from table 116 desired values of C and S to be used if (306) the desired C and S values are lower than those currently used, power conservation module 126 selects (307) connections which are to be closed and instructs (308) routing module 124 to stop routing client requests on the selected connections and when the selected connections are not used anymore, connection manager 122 closes (312) the selected connections. If (306) the desired C and S values are greater than those currently used, connection manager 122 is instructed (314) to establish additional connections and these connections are used by routing module 124.

The determination (302) of the current TPS value is optionally performed less than every 10 minutes, less than every 2 minutes or even less than every half of a minute. Frequent determination of the TPS value allows for providing a fast response to changes in traffic patterns, thus providing better power conservation and/or better response times. Alternatively, the TPS is determined less frequently, such as every 15 minutes or less often, in order to limit the resources spent on determining the TPS. The determination (302) of the TPS value is optionally performed by counting the number of transaction requests received over a predetermined duration and dividing by its length. Optionally, a relatively short duration, for example less than 15 second or even less than 10 seconds is used. The predetermined duration is optionally substantially shorter than the interval between determining the TPS. Alternatively, the predetermined duration is longer than the interval between determinations, such that at least some data is used in calculating the TPS at a plurality of different times. Determining the TPS based on averaging over a relatively long duration, smoothes the data and prevents momentary peaks from causing short term changes. Optionally, in the averaging, more weight is given to recent measurements.

In some embodiments of the invention, power conservation module 126 additionally monitors the response time of the servers 102, and if necessary the number of connections is increased beyond that prescribed by the TPS in order to achieve a suitable response time. Optionally, when it often occurs that the number of connections is increased beyond that prescribed by the TPS, a learning mode operation is scheduled in order to update table 116 to the current conditions. Similarly, when the response time is much lower than expected, or otherwise indications are received that too large a number of servers and/or connections are employed, load balancer 104 moves into a learning mode when possible.

In some embodiments of the invention, power conservation module 126 periodically, for example once a day or once a week, instructs routing module 124 to operate for a test period with fewer connections than prescribed by table 116 for the current TPS. If during the test period it is determined that the response time does not go beyond the level allowed by the SLA although the number of connections is beneath that prescribed by table 116, a learning mode operation is scheduled.

As to selecting (307) connections to be closed, in some embodiments of the invention the connections with the least traffic are closed. Alternatively, the connections to be closed are selected in a manner which leaves an even distribution of connections between the servers 102 currently employed. Typically, if a server 102 is to be closed down, all the connections to that server are closed.

In addition to selecting (307) connections to be closed and/or to instructing (314) connection manager 122 to establish additional connections, load balancer 104 may select servers 102 to be shut down and/or to be put into operation, as appropriate according to the contents of the appropriate entry of table 116. Optionally, shutting down a server is performed by closing all the connections to the server.

In some embodiments of the invention, all the individual servers 102 have substantially the same processing power. In such embodiments, when a server 102 is to be allowed to shut down, the specific server to be shut down may be selected randomly or as the server having the least connections, the least active connections and/or the least outstanding transactions. In other embodiments of the invention, different servers 102 have different processing power capabilities. In such embodiments, when in the learning mode 200, load balancer 104 optionally tests the power consumption of the different servers 102 and table 116 optionally includes not only indications of the number of servers 102 to be used, but also indications of which servers 102 are to be used.

As mentioned above, in some embodiments, load balancer 104 does not control servers 102, but rather only the load it generates for the servers. In other embodiments, agents 152 on servers 102 are controlled by load balancer 104 and are in charge of setting the power consumption of their respective servers 102.

Optionally, in determining (304) the desired C, S from table 116, the current TPS is rounded to the closest TPS for which there is an entry in table 116. Alternatively, the current TPS is increased to the closest TPS value having an entry in table 116, to ensure that the required response time will be met. Further alternatively, an intermediate value of C and S of the table entries of the TPS immediately above and below the current value, are used.

Hysteresis

Optionally, power conservation module 126 operates with hysteresis, in not initiating a change in the number of connections less than a predetermined duration after a previous change in the number of connections in an opposite direction, in order to avoid too frequent changes in the number of connections. Optionally, a single predetermined duration is waited for all changes, both for increasing and decreasing the number of connections. Alternatively, one wait period is used when changing the number of connections and a second wait period, different from the first, is used when changing the number of servers. In some embodiments of the invention, different wait periods are used when increasing the number of connections/servers and when decreasing the number of connections servers.

Optionally, the minimal duration between changes in the number of connections in opposite directions is at least twice, at least four times or even at least eight times the length of the duration between consecutive determinations of the current load on server system 100.

In some embodiments of the invention, during the learning mode 200, separate tests and entries in table 116 are performed for different connection histories, for example for cases in which the load is increasing and for cases in which load is decreasing. Possibly, separate tests are performed and different entries are made in table 116 for different rates of change of the load. In the routing mode 300 in accordance with such embodiments, power conservation module 126 determines (304) the C and S to be used based on the current TPS as compared to one or more previously determined values of TPS and accordingly finds a corresponding entry in table 116.

CONCLUDING COMMENTS

Network 110 may be of any type suitable to carry client requests and responses thereto, such as various wire and wireless networks including networks using optical fibers, cables, satellite networks and cellular transmissions. The transmissions on network 110 may be governed by various protocols, such as asynchronous transfer mode (ATM), Internet protocol (IP), TCP and/or Ethernet. Network 110 may be an intranet or other private network or may be a public network, such as the Internet. Servers 102 may provide any of various services, such as web content, database information, social network information and web applications and may be managed by various institutions, such as large web site hosts, banks and educational institutions. Servers 102 may receive requests in accordance with the HTTP protocol or any other suitable protocol.

Load balancer 104 may be implemented in hardware, firmware, software and/or combinations thereof, for example using general purpose processors, DSPs, ASICs, FPGAs and/or other types of processing units. It will be appreciated that the above described methods may be varied in many ways, such as changing the order of processing steps, and/or performing a plurality of steps concurrently. It will also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

What is claimed as new and desired to be protected by Letters Patent of the United States is:

1. A network device that is operative to balance communication over a network, comprising:
    a network interface;
    a memory for storing instructions; and
    a processor that is operative to execute the stored instructions to enable actions, including:
        determining at least one operation parameter for a plurality of server devices based on a plurality of test load values and a plurality of test load balance parameter values that are employed to represent a plurality of different external conditions and different routing parameters for communication with the plurality of server devices;
        transmitting a plurality of test requests to the plurality of server devices based on the at least one determined operation parameter, wherein a plurality of routing parameters for communication with the plurality of server devices are determined based on the transmitting of the plurality of test requests;
        correlating the determined routing parameters to the plurality of different external conditions; and
        routing a plurality of requests from at least one client device to at least one of the plurality of server devices based on at least one of the determined routing parameters, wherein the at least one determined routing parameter is adjustable to correlate with a current external condition.

2. The network device of claim 1, further comprising generating a correlation table between the determined routing parameters and the plurality of different external conditions.

3. The network device of claim 1, wherein the at least one operation parameter of the plurality of server devices further comprises a measure of a response time to a request.

4. The network device of claim 1, wherein the determined routing parameters further comprise at least one of:
    a number of server devices to which requests are routed;
    a number of connections employed to route requests to the plurality of server devices; and
    a rate at which the plurality of requests are forwarded to the plurality of server devices.

5. The network device of claim 1, wherein the transmitting the test requests further comprises determining routing parameters that correspond to particular external conditions and also use a minimum amount of resources to forward the test requests to the plurality of server devices within a predetermined time range.

6. The network device of claim 1, wherein the transmitting of test requests occurs at a periodic time or a plurality of predetermined times.

7. A method for load balancing communication over a network with a network device, comprising:
    employing the network device to determine at least one operation parameter for a plurality of server devices based on a plurality of test load values and a plurality of test load balance parameter values that are employed to represent a plurality of different external conditions and different routing parameters for communication with the plurality of server devices;
    employing the network device to transmit a plurality of test requests to the plurality of server devices based on the at least one determined operation parameter; wherein a plurality of routing parameters for communication with the plurality of server devices are determined based on the transmitting of the plurality of test requests;

employing the network device to correlate the determined routing parameters to the plurality of different external conditions; and employing the network device to route a plurality of requests from at least one client device to at least one of the plurality of server devices based on at least one of the determined routing parameters, wherein the at least one determined routing parameter is adjustable to correlate with a current external condition.

8. The method of claim 7, further comprising generating a correlation table between the determined routing parameters and the plurality of different external conditions.

9. The method of claim 7, wherein the at least one operation parameter of the plurality of server devices further comprises a measure of a response time to a request.

10. The method of claim 7, wherein the determined routing parameters further comprise at least one of:
a number of server devices to which requests are routed;
a number of connections employed to route requests to the plurality of server devices; and
a rate at which the plurality of requests are forwarded to the plurality of server devices.

11. The method of claim 1, wherein the transmitting the test requests further comprises determining routing parameters that correspond to particular external conditions and also use a minimum amount of resources to forward the test requests to the plurality of server devices within a predetermined time range.

12. The method of claim 7, wherein the transmitting of test requests occurs at a periodic time or a plurality of predetermined times.

13. A system that is operative to balance communication over a network, comprising:
a plurality of server devices that are operative to respond to a plurality of requests that are communicated over the network;
a network device that is operative to execute instructions to enable actions, including:
determining at least one operation parameter for a plurality of server devices based on a plurality of test load values and a plurality of test load balance parameter values that are employed to represent a plurality of different external conditions and different routing parameters for communication with the plurality of server devices;
transmitting a plurality of test requests to the plurality of server devices based on the at least one determined operation parameter, wherein a plurality of routing parameters for communication with the plurality of server devices are determined based on the transmitting of the plurality of test requests;
correlating the determined routing parameters to the plurality of different external conditions; and
routing a plurality of requests from at least one client device to at least one of the plurality of server devices based on at least one of the determined routing parameters wherein the at least one determined routing parameter is adjustable to correlate with a current external condition.

14. The system of claim 13, further comprising generating a correlation table between the determined routing parameters and the plurality of different external conditions.

15. The system of claim 13, wherein the at least one operation parameter of the plurality of server devices further comprises a measure of a response time to a request.

16. The system of claim 13, wherein the determined routing parameters further comprise at least one of:
a number of server devices to which requests are routed;
a number of connections employed to route requests to the plurality of server devices; and
a rate at which the plurality of requests are forwarded to the plurality of server devices.

17. The system of claim 13, wherein the transmitting the test requests further comprises determining routing parameters that correspond to particular external conditions and also use a minimum amount of resources to forward the test requests to the plurality of server devices within a predetermined time range.

18. The system of claim 13, wherein the transmitting of test requests occurs at a periodic time or a plurality of predetermined times.

19. A processor readable non-transitive storage media that includes instructions, wherein execution of the instructions by a processor enables actions for load balancing communication over a network with a network device, comprising:
enabling the network device to determine at least one operation parameter for a plurality of server devices based on a plurality of test load values and a plurality of test load balance parameter values that are employed to represent a plurality of different external conditions and different routing parameters for communication with the plurality of server devices;
enabling the network device to transmit a plurality of test requests to the plurality of server devices based on the at least one determined operation parameter, wherein a plurality of routing parameters for communication with the plurality of server devices are determined based on the transmitting of the plurality of test requests;
enabling the network device to correlate the determined rooting parameters to the plurality of different external conditions; and
enabling the network device to route a plurality of requests from at least one client device to at least one of the plurality of server devices based on at least one of the determined routing parameters, wherein the at least one determined routing parameter is adjustable to correlate with a current external condition.

20. The media of claim 19, further comprising generating a correlation table between the determined routing parameters and the plurality of different external conditions.

21. The media of claim 19, wherein the at least one operation parameter of the plurality of server devices further comprises a measure of a response time to a request.

22. The media of claim 19, wherein the determined routing parameters further comprise at least one of:
a number of server devices to which requests are routed;
a number of connections employed to route requests to the plurality of server devices; and
a rate at which the plurality of requests are forwarded to the plurality of server devices.

23. The media of claim 19, wherein the transmitting the test requests further comprises determining routing parameters that correspond to particular external conditions and also use a minimum amount of resources to forward the test requests to the plurality of server devices within a predetermined time range.

* * * * *